UNITED STATES PATENT OFFICE.

CHARLES A. WOLF, OF PHILADELPHIA, PENNSYLVANIA.

CROTALIN PREPARATION.

1,092,550. Specification of Letters Patent. Patented Apr. 7, 1914.

No Drawing. Application filed November 7, 1913. Serial No. 799,758.

*To all whom it may concern:*

Be it known that I, CHARLES A. WOLF, a citizen of the United States, residing at Philadelphia, in the county of Philadelphia and State of Pennsylvania, have invented certain new and useful Improvements in Crotalin Preparations, of which the following is a specification The object of this invention is to provide preparations of crotalin characterized by such degree of stability that they will not undergo deterioration or loss of efficiency under proper conditions of storage, even for comparatively long periods.

As is known, crotalin is a substance occurring in the poison glands of snakes of the genus "*Crotalus*." It is obtained from the glands of the rattlesnake, and is chiefly used as a medicament for epilepsy. It is a highly unstable body of the albuminous type, and is coagulated or precipitated by the usual preservative agents, including phenol, such precipitation involving loss or impairment of its curative properties.

I have discovered that crotalin may be effectively preserved or rendered stable, without impairing its value as a medicament by adding to its aqueous solutions a very small proportion of tricresol (trikresol), preferably previously dissolved in glycerin.

My novel preparation may be made as follows: The venom derived from the glands of rattlesnakes is digested at a temperature of 60-70° F., with sufficient distilled water for its solution. There is then added to this solution a small proportion of tricresol, the preferred proportion being approximately one-half of one per cent. by weight of the venom solution. It is preferred that the tricresol be dissolved, before adding it to the dissolved venom, in a quantity of glycerin sufficient for the purpose.

I claim:—

1. A new composition of matter containing crotalin and tricresol.

2. As a new composition of matter, a solution containing crotalin and tricresol, the tricresol in the approximate proportion of one-half of one per cent. by weight of the crotalin solution.

In testimony whereof I affix my signature in presence of two witnesses.

CHARLES A. WOLF.

Witnesses:
 HARRY J. STANDRING,
 HARRY BECKMAN.